United States Patent Office 3,352,252
Patented Nov. 14, 1967

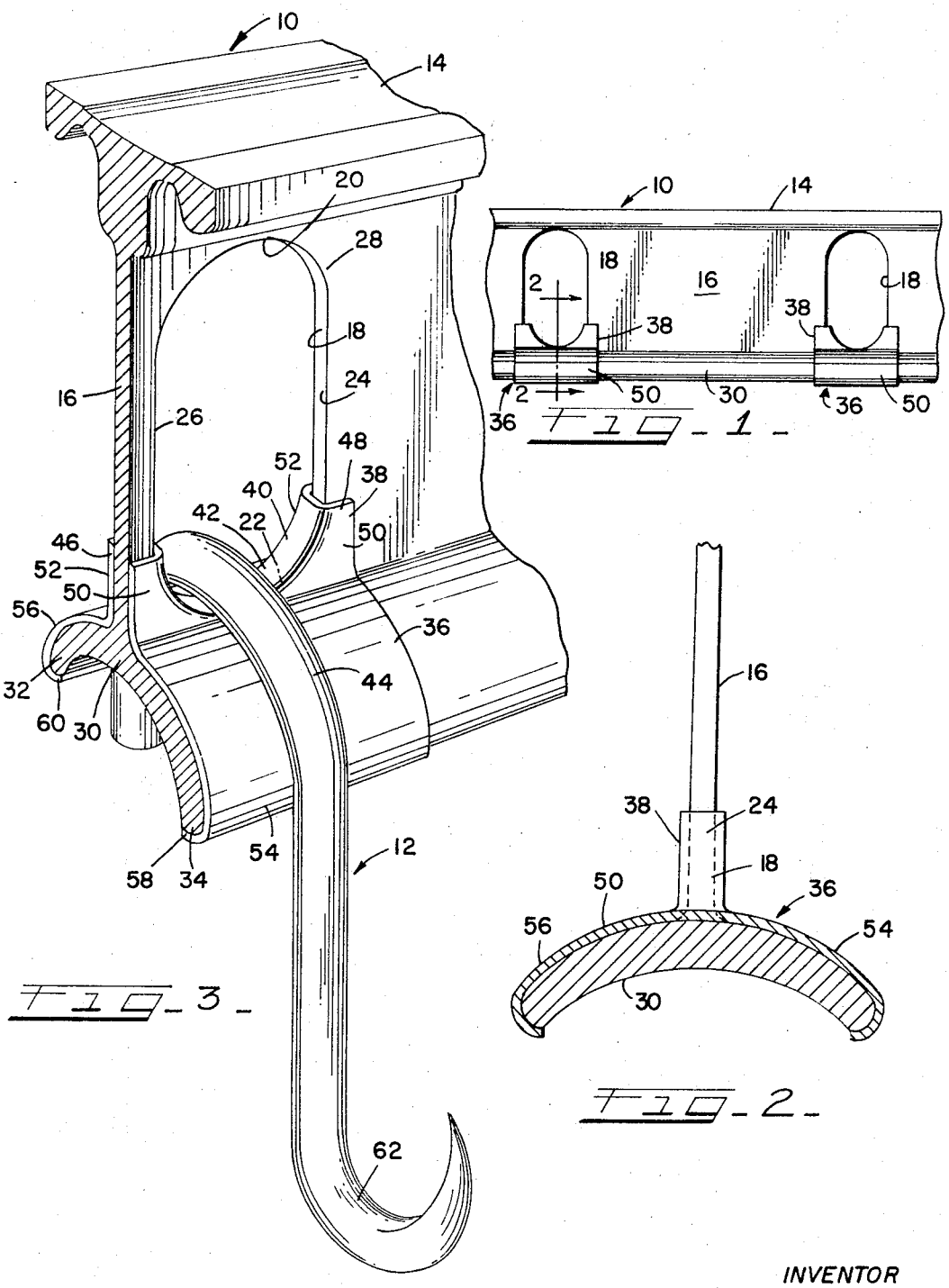

3,352,252
OVERHEAD RAIL DESIGN
William A. Bertolini, Woodside, N.Y., assignor to Pullman Incorporated, Chicago, Ill., a corporation of Delaware
Filed Dec. 28, 1965, Ser. No. 516,968
8 Claims. (Cl. 104—106)

ABSTRACT OF THE DISCLOSURE

A stainless steel meat hook flexible shield for an aluminum meat rail for prevention of meat contamination, the shield having a meat hook receiving concave saddle and having a clamp portion for snapping the shield about the lower transverse flange of the meat rail.

---

This invention relates to an improved overhead rail design, and in particular, relates to an improved shielded rail for supporting a hook and also comprehends a novel shield therefor.

In the meat packing industry, and in particular, in refrigerated trailers or truck or railroad car construction, there is provided a rail design which is utilized for carrying dressed meats, such as sides of beef, veal, lamb and pork, etc. In such construction, the meat is hung from hooks which are supported by longitudinally extending meat supporting rails. Generally, these rails are of two types; an extruded aluminum I shaped beam with holes punched in the web at predetermined intervals to accommodate the meat hooks, or tubular stainless steel rails supported at regular intervals by brackets. The former design has the advantage of light weight, low cost, and fore-and-aft retention of the meat hook. It does, however, have the disadvantage of allowing powdered aluminum to be generated by the scuffing action of the galvanized steel meat hook rubbing or chafing on the aluminum extruded part. This powder, which is black, then falls to the meat suspended below and thereby discolors it. The latter tubular steel design has the advantage of stainless steel construction, which does not flake off to discolor the meat, but does have the disadvantages of being heavier, and costlier than the former, and does not provide longitudinal retention for the meat hook.

The invention comprehends providing for a shield that will conform to the apertured rail and provide a good wear resisting surface upon which the hook is supported. The shield is flexible in nature and is readily snapped on to the rail and is so constructed for easy entry to the opening of the rail and upon the rail surface.

It is therefore a general object of this invention to provide for a novel meat bearing rail design that will readily support a meat carrying hook.

Another object of this invention is to provide a novel meat hook rail design that is provided with a shield having good wear characteristics.

Another object of this invention is to provide a novel rail design for carrying a meat hook that is provided with a flexible shield that is snapped snugly on in place on the rail.

A further object of this invention is to provide a novel shield for an apertured rail receiving a meat hook whereby the hook rests on the shield and prevents the rail from contaminating the meat.

Still another object of this invention is to provide a novel flexible shield that may be readily snap-fitted within the aperture or opening of the apertured web portion of the rail, the shield being metal or plastic.

These and other objects of the invention will become apparent from the following description and appended drawings in which:

FIG. 1 illustrates a section of the rail assembly provided with several apertured portions receiving several shields;

FIG. 2 is a sectional view taken on line 2—2 of FIG. 1; and

FIG. 3 is a perspective view of the invention carrying a meat hook.

Now with reference to the drawings there is shown a rail 10 for supporting a meat hook 12 for supporting variout portions of meat such as beef, lamb, etc. as for instance, within a refrigerated meat storage area, such as in a refrigerated container or trailer or railway car, etc. The rail has an upper flange 14 for attachment to the roof of a refrigerated compartment (not shown) from which depends a vertical web section 16, having a vertically elongated aperture 18 as defined by the top and bottom curved wall sections 20 and 22 and the side wall sections 24 and 26 of the apertured portion 28 of the web section 16. The rail 10 has an arcuate or curved lower flange section 30 joined to the web section 16, the curved flange section 30 having outwardly, downwardly extending end sections 32 and 34.

A meat shield 36 is disposed within the aperture 18 and about the lower curved flange section 30. The meat shield has an upper saddle portion 38, having an arcuate concave portion 40 presenting a surface 42 upon which rests the upper curved or hook-shaped portion 44 of the hook 12, the outsides of the saddle 38 rising upwardly from the central portion of the saddle to define a pair of spaced-apart U shaped sections 46 and 48 in cross section, said sections 46 and 48 partially encircling the lower portions of the recessed web portion 28, namely, front and rear sections 50 and 52 respectively. The saddle part 38 of the meat shield 36 is joined to fore-and-aft curved convex clamping parts 54 and 56, which extend about the upper surfaces of the end sections 32 and 34 of the lower flange 30 in close and snug relation thereto, the extremities 58 and 60 of the respective sections 54 and 56 partially encompassing the nub or bight parts of the end sections 32 and 34 of the flange 30. The meat shield 36 is made of flexible material, preferably of metal such as stainless steel, and the shield 36 is of such dimension that it may be placed on end and fitted through the elongated aperture 18 and then orientated 90 degrees to have its end clamp portions 54 and 56 snap about the ends 32 and 34 of the lower bowled flange sections 30. A plurality of these shields 36 are shown in FIG. 1. The meat hook has a lower meat engaging hook portion 62 for holding a slab of meat.

The hook 12 is made of metal such as galvanized steel and its upper portion 44 rests on the saddle 38 such that when a slab of meat is placed on the hook section 62 the upper hook portion 44 slides on the saddle but since the shield is of good wear-resistant material such as stainless steel none of the shield material is allowed to wear off and flake on to the meat below. The protective meat shield is of one-piece construction made from a stamping or the like and being flexible is easily inserted into the aperture 18 and snap-fitted onto the lower flange 30 of the rail 10. The upper extending portions 46 and 48 of the saddle 38 allows sufficient rolling action for the hook and yet prevent the hook 12 from riding up onto the sides 26 and 24 of the web section 16 of the rail 10. Such an arrangement provides for good wearability and has the advantage of lower weight than aluminum rail section. This arrangement also provides for a lower cost and a positive fore-and-aft retention of the meat hooks.

It will be appreciated that the shield may be made from a tough plastic or elastomeric material such as nylon or other tough inorganic synthetic materials as well as flexible sheet steel.

Although the invention has been described with a certain degree of particularity, it is understood that the present disclosure has been made only by way of example and that numerous changes in the details of construction or materials and the combination and the arrangement of parts may be resorted to without departing from the spirit and scope of invention as hereinafter claimed.

What is claimed is:

1. An improved rail design for supporting a meat hook and preventing rail material from contaminating meat comprising a rail having an apertured web section and a lower transverse flange connected to and depending from the web section, said web section having a pair of opposed side wall portions and top and bottom wall portions defining a hook receiving aperture, a high wear resistant meat hook shield having a saddle portion snugly fitted about the bottom and side wall portions and having transverse sections snap-fitted around the lower flange in embracing relation therewith and said saddle portion being provided with a hook engaging surface of high wear resistant material.

2. A stainless steel meat hook shield for a meat rail of aluminum for prevention of meat contamination and having an apertured web and a lower transverse flange for insertion through the aperture of the rail and about the lower flange of the rail, said shield having a hook receiving upper outwardly facing hook bearing saddle portion of concave shape and having a pair of lower clamp portions depending from the saddle portion and being generally perpendicular thereto for engaging the lower flange of the rail, said flange shield portions being flexible to snap-fit around the rail flange.

3. A one-piece meat shield of flexible sheet high wear resistant material having for prevention of meat contamination a hook receiving upper outwardly facing saddle portion with spaced apart upright portions for engaging the lower apertured portion of a rail and having a pair of lower transversely extending clamping parts conforming to and curving around and snapped upon the transverse flange portion of a metal meat rail in snug relation with the rail.

4. The invention according to claim 3 and said shield being made of steel.

5. The invention according to claim 3 and said rail being made of aluminum.

6. An improved meat rail design for preventing meat contamination and comprising a meat rail having a lower flange portion and an upper elongated upright web section of aluminum material provided with an apertured portion having an upright elongated opening defined by side and top and bottom wall portions of the apertured portion, a flexible meat shield of high wear resistant material for receiving a hook for meat, said shield having a saddle portion defined by an upper hook receiving concave central portion engaging the bottom wall of the recess in snug relation and a pair of opposed upright portions joining with the central portion and partially encompassing the side walls of the apertured portion, said shield having a lower clamping portion joined into one-piece relation with the saddle portion and having a pair of transversely extending clamping sections provided with curved extremities and having snug engagement with the lower flange portion of the rail.

7. The invention according to claim 6 and said shield being made of tough flexible material selected from the group consisting of sheet steel and organic plastics.

8. The invention according to claim 6 and said rail being made of aluminum.

References Cited

UNITED STATES PATENTS

| 1,731,758 | 10/1929 | Viden | 308—237 |
| 2,833,588 | 5/1958 | Black. | |
| 3,286,650 | 11/1966 | King | 104—106 |

FOREIGN PATENTS

| 229,768 | 8/1912 | Great Britain. |

ARTHUR L. LA POINT, *Primary Examiner.*

J. E. BABER, *Assistant Examiner.*